US008228855B2

(12) United States Patent
Sambhwani et al.

(10) Patent No.: US 8,228,855 B2
(45) Date of Patent: Jul. 24, 2012

(54) UPLINK POWER HEADROOM DEFINITION FOR E-DCH IN CELL_FACH

(75) Inventors: Sharad Deepak Sambhwani, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 12/408,244

(22) Filed: Mar. 20, 2009

(65) Prior Publication Data

US 2009/0238136 A1 Sep. 24, 2009

Related U.S. Application Data

(60) Provisional application No. 61/039,057, filed on Mar. 24, 2008, provisional application No. 61/095,483, filed on Sep. 9, 2008.

(51) Int. Cl.
*H04W 4/00* (2009.01)
(52) U.S. Cl. ...................................................... 370/329
(58) Field of Classification Search .................. 370/329, 370/330, 322, 341, 338, 348, 431, 432, 437, 370/468, 471, 395.4, 395.41, 401; 455/411, 455/450, 452.1
See application file for complete search history.

(56) References Cited

U.S. PATENT DOCUMENTS

| 4,764,804 | A | 8/1988 | Sahara et al. |
|---|---|---|---|
| 5,532,512 | A | 7/1996 | Fillion et al. |
| 5,825,080 | A | 10/1998 | Imaoka et al. |
| 6,278,181 | B1 | 8/2001 | Maley |
| 6,337,513 | B1 | 1/2002 | Clevenger et al. |
| 6,720,662 | B1 | 4/2004 | Den |
| 7,408,895 | B2 * | 8/2008 | Zhang et al. ............ 370/318 |
| 7,904,055 | B2 * | 3/2011 | Lee et al. ............... 455/411 |
| 2005/0083943 | A1 | 4/2005 | Lee et al. |
| 2005/0265301 | A1 | 12/2005 | Heo et al. |
| 2006/0104240 | A1 | 5/2006 | Sebire et al. |
| 2006/0268822 | A1 | 11/2006 | Chun et al. |
| 2007/0205502 | A1 | 9/2007 | Liu et al. |
| 2008/0043670 | A1 | 2/2008 | Marinier |
| 2008/0045255 | A1 | 2/2008 | Revel et al. |

FOREIGN PATENT DOCUMENTS

EP  1370011 A2  12/2003

(Continued)

OTHER PUBLICATIONS

International Search Report and Written Opinion—PCT/US2009/037976, International Search Authority—European Patent Office—Sep. 1, 2009.

(Continued)

*Primary Examiner* — Chi Pham
*Assistant Examiner* — Alexander Boakye
(74) *Attorney, Agent, or Firm* — D. Scott Juneau

(57) ABSTRACT

Systems and methodologies are described that facilitate reporting an uplink power headroom (UPH) during an E-DCH transmission in a CELL_FACH state. For a E-DCH transmission, a reduced measurement period can be utilized in order to report a UPH measurement. In particular, the reduced measurement period can be less than 100 milliseconds. The UPH measurement can be communicated based upon receipt of AICH/E-AICH and transmission of DPCCH for a configurable number of radio frames. The UPH measurement can be based upon the transmitted power prior to actual data transmission. Additionally, the UPH measurement can be included within scheduling information portion of a MAC header.

40 Claims, 10 Drawing Sheets

FOREIGN PATENT DOCUMENTS

| | | |
|---|---|---|
| EP | 1860797 A1 | 11/2007 |
| EP | 1998483 A1 | 12/2008 |
| RU | 2172067 | 8/2001 |
| RU | 2253947 C2 | 6/2005 |
| WO | WO9631014 | 10/1996 |
| WO | WO2007108097 | 9/2007 |

OTHER PUBLICATIONS

Qualcomm Europe: "L1/2 aspects for enhanced UL for CELL_FACH" 3GPP Draft; R1-074126, 3RD Generation Partnership Project (3GPP), Mobile Competence Centre ; 650, Route Des Lucioles ; F-06921 Sophia-Antipolis CEDEX; France, vol. RAN WG1, no. Shanghai, China; 20071008, Oct. 2, 2007, XP050107658.

Qualcomm Europe: "Uplink Power Headroom definition for E-DCH in CELL_FACH" 3GPP Draft; R2-081568, 3RD Generation Partnership Project (3GPP), Mobile Competence Centre ; 650, Route Des Lucioles ; F-06921 Sophia-Antipolis CEDEX ; France, vol. RAN WG2, no. Shenzhen, China; 20080331, Mar. 24, 2008, XP050139303.

* cited by examiner

UPLINK POWER HEADROOM DEFINITION FOR E-DCH IN CELL_FACH

CROSS-REFERENCE TO RELATED APPLICATIONS

This application claims the benefit of U.S. Provisional Patent application Ser. No. 61/039,057 entitled "UPLINK POWER HEADROOM DEFINITION FOR E-DCH IN CELL_FACH" which was filed Mar. 24, 2008 and U.S. Provisional Patent application Ser. No. 61/095,483 entitled "UPLINK POWER HEADROOM DEFINITION FOR E-DCH IN CELL_FACH" which was filed Sep. 9, 2008. The entireties of the aforementioned applications are herein incorporated by reference.

BACKGROUND

I. Field

The following description relates generally to wireless communications, and more particularly to report uplink power headroom (UPH) measurement for an enhanced dedicated channel (E-DCH) transmission.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Typical E-DCH transmissions in CELL_FACH state can be short in duration. During the start of such duration, a MAC-e scheduler may not have information related to the UPH measurement. This can lead to having to schedule user equipment (UE) very conservatively. Such conservative scheduling can lead to longer E-DCH transmissions when the UE has a large amount of data to send. Moreover, this conservative scheduling can impact collision and blocking probability of the E-DCH resources.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method can facilitate delivering an Uplink Power Headroom (UPH) measurement associated with an enhanced dedicated channel (E-DCH) transmission in a CELL_FACH state. The method can include transmitting a portion of a physical random access channel (PRACH) preamble upon receipt of an acquisition indication channel (AICH). The method can further comprise communicating a dedicated physical control channel (DPCCH) for a configurable radio frame. The method can also include evaluating a transmitted power level for the UE prior to a data transmission associated with E-DCH. The method can include incorporating the UPH measurement within a scheduling information (SI) portion of a header, wherein the incorporation is based at least in part upon the evaluated transmitted power level for the E-DCH transmission.

Another aspect relates to a wireless communications apparatus. The wireless communications apparatus can include at least one processor configured to transmit a portion of a physical random access channel (PRACH) preamble upon receipt of an acquisition indication channel (AICH), communicate a dedicated physical control channel (DPCCH) for a configurable radio frame, evaluate a transmitted power level for the UE prior to a data transmission, or incorporate the UPH measurement within a scheduling information (SI) portion of a header, wherein the incorporation is based at least in part upon the evaluated transmitted power level for the E-DCH transmission.

Yet another aspect relates to a wireless communications apparatus that enables delivering an Uplink Power Headroom (UPH) measurement associated with an enhanced dedicated channel (E-DCH) transmission in a CELL_FACH state. The wireless communications apparatus can include means for transmitting a portion of a physical random access channel (PRACH) preamble upon receipt of an acquisition indication channel (AICH). Additionally, the wireless communications apparatus can include means for communicating a dedicated physical control channel (DPCCH) for a configurable radio frame. The wireless communications apparatus can further include means for evaluating a transmitted power level for the UE prior to a data transmission. Furthermore, the wireless communications apparatus can include means for incorporating the UPH measurement within a scheduling information (SI) portion of a header, wherein the incorporation is based at least in part upon the evaluated transmitted power level for the E-DCH transmission.

Still another aspect relates to a computer program product comprising a computer-readable medium having stored thereon code for causing at least one computer to transmit a portion of a physical random access channel (PRACH) preamble upon receipt of an acquisition indication channel (AICH), code for causing at least one computer to communicate a dedicated physical control channel (DPCCH) for a configurable radio frame, code for causing at least one computer to evaluate a transmitted power level for the UE prior to a data transmission, and code for causing at least one computer to incorporate the UPH measurement within a scheduling information (SI) portion of a header, wherein the incorporation is based at least in part upon the evaluated transmitted power level for the E-DCH transmission.

According to other aspects, a method can facilitate receiving an Uplink Power Headroom (UPH) measurement for a user equipment (UE) in CELL_FACH. The method can include detecting an enhanced dedicated channel (E-DCH) transmission in a CELL_FACH state. The method can further include utilizing a reduced measurement period to calculate the UPH measurement associated with the E-DCH transmission within CELL_FACH, wherein the reduced measurement period is less than 100 milliseconds. The method can further comprise requesting the UPH measurement from the UE based upon the reduced measurement period. The method can also include evaluating a received portion of scheduling information (SI) within a header to identify the requested UPH measurement.

Another aspect relates to a wireless communications apparatus. The wireless communications apparatus can include at least one processor configured to detect an enhanced dedicated channel (E-DCH) transmission in a CELL_FACH state, utilize a reduced measurement period to calculate the UPH measurement associated with the E-DCH transmission within CELL_FACH, wherein the reduced measurement period is less than 100 milliseconds, request the UPH measurement from the UE based upon the reduced measurement period, and evaluate a received portion of scheduling information (SI) within a header to identify the requested UPH measurement.

Another aspect relates to a wireless communications apparatus that enables receiving an Uplink Power Headroom (UPH) measurement for a user equipment (UE) in CELL_FACH. The wireless communications apparatus can include means for detecting an enhanced dedicated channel (E-DCH) transmission in a CELL_FACH state. The wireless communications apparatus can further include means for utilizing a reduced measurement period to calculate the UPH measurement associated with the E-DCH transmission within CELL_FACH, wherein the reduced measurement period is less than 100 milliseconds. Moreover, the wireless communications apparatus can further include means for requesting the UPH measurement from the UE based upon the reduced measurement period. The wireless communications apparatus can include means for evaluating a received portion of scheduling information (SI) within a header to identify the requested UPH measurement.

Still another aspect relates to a computer program product comprising a computer-readable medium having stored thereon code for causing at least one computer to detect an enhanced dedicated channel (E-DCH) transmission in a CELL_FACH state, code for causing at least one computer to utilize a reduced measurement period to calculate the UPH measurement associated with the E-DCH transmission within CELL_FACH, wherein the reduced measurement period is less than 100 milliseconds, code for causing at least one computer to request the UPH measurement from the UE based upon the reduced measurement period, and code for causing at least one computer to evaluate a received portion of scheduling information (SI) within a header to identify the requested UPH measurement.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
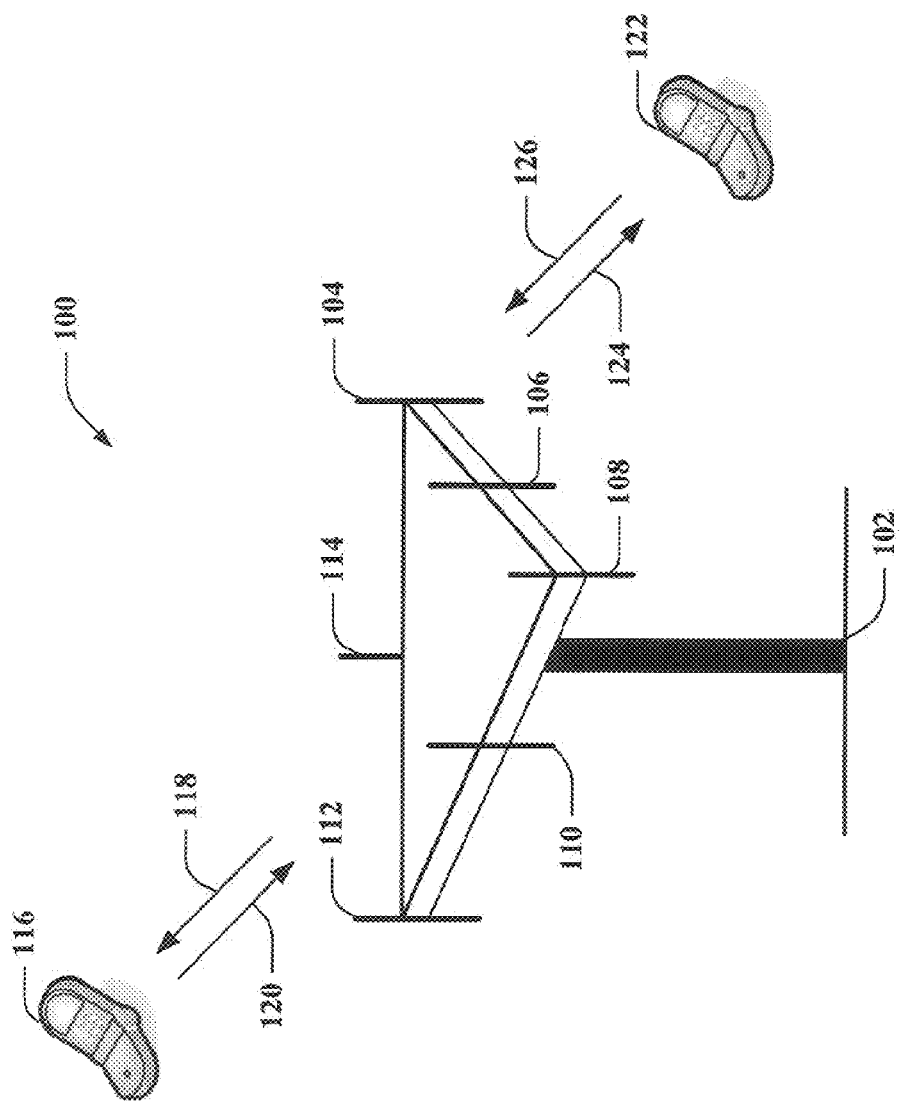
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "component," "evaluator," "packager," "reporter," "detector," "analyzer," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g. mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

In general, the subject innovation can utilize a reduced measurement period for uplink power headroom (UPH) measurement for enhanced dedicated channel (E-DCH) transmissions. In addition, the subject innovation can enable a user equipment (UE) to be configured in order to report a UPH measurement in accordance with the reduced measurement period during a detected E-DCH transmission. The UE transmission power headroom measurement can be an estimate of the average value of the UE transmission power headroom over a 100 millisecond (ms) period. The UE transmission power headroom measurement can exclude the empty slots created by a compressed mode or discontinuous uplink DPCCH transmission. By employing a reduced measurement period, the subject innovation can provide the UPH measurement during the E-DCH transmission in CELL_FACH state. In other words, the MAC-e scheduler can be provided the UPH measurement during the reduced measurement period in order to more accurately schedule the UE. This can reduce E-DCH transmissions and reduce impact collision and unblock probability of E-DCH resources.

It is to be appreciated that if the UE is in CELL_FACH state, the UE can be configured to send DPCCH for a configurable number of radio frames prior to the start of the E-DCH transmissions. The UE in CELL_FACH state reports the headroom available based on the average of the DPCCH power including the period DPCCH is transmitted prior to the start of the E-DCH transmissions. The averaging period for the UE transmission power headroom measurement in CELL_FACH state, after the commencement of the data transmission, is 10 ms. For the first measurement, if less than 20 ms of DPCCH is configured prior to the start of the E-DCH transmissions, the UE in CELL_FACH state reports the headroom available based on the last successfully transmitted PRACH preamble power. In this case, the UPH can be computed from $P_{preamble}$ using the $P_{p-e}$: $UPH=P_{max,tx}-P_{preamble}-P_{p-e}$, where $P_{max,tx}$ is the UE maximum transmission power, $P_{preamble}$ is the transmitted code power on PRACH preamble, and $P_{p-e}$ is the power offset between the power of the last transmitted preamble and the initial DPCCH transmission power, all in dB.

Figure 2:
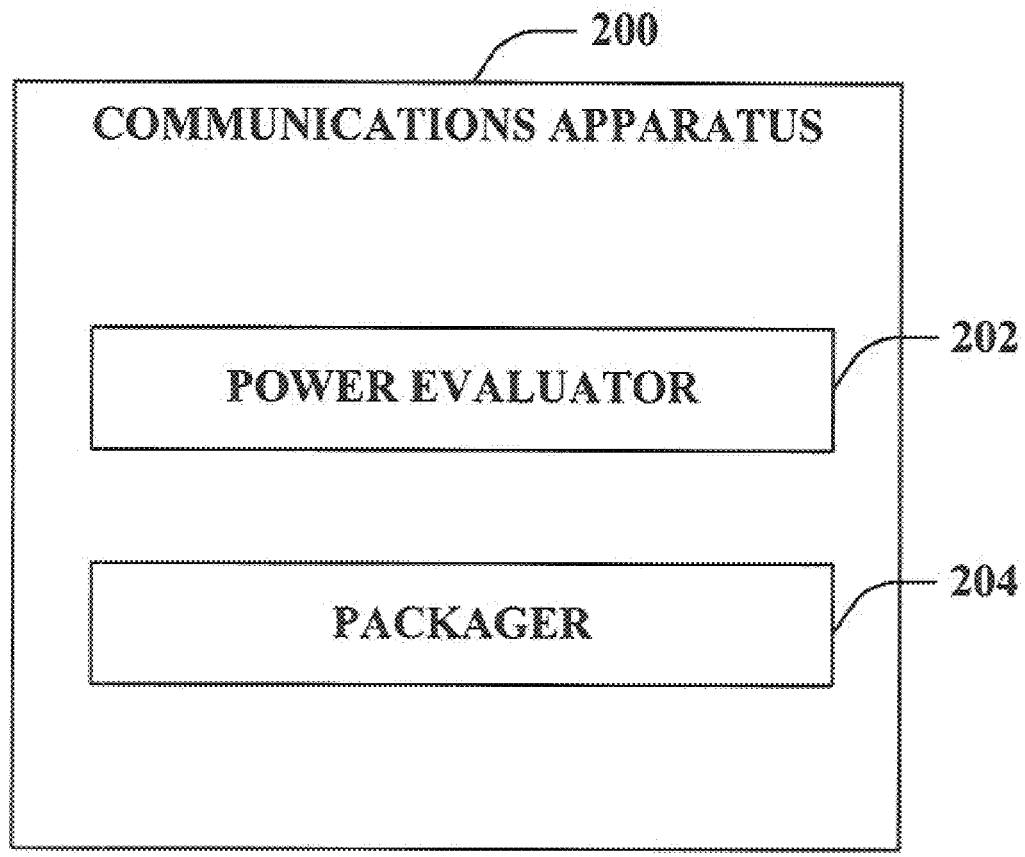
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 employ components described below to configure the communications apparatus 200 to report the UPH measurement during a reduced measurement period that is less than 100 ms.

The communications apparatus 200 can include a power evaluator 202 that can ascertain the available headroom (e.g., UPH) based on a transmitted power level prior to when an E-DCH data transmission begins. In particular, the power evaluator 202 can configure the communication apparatus 200 to send DPCCH for a configurable number of radio frames and then report the headroom available prior to actual data transmission. It is to be appreciated that if no DPCCH preambles are configured, the power evaluator 202 can report a most recent transmitted PRACH preamble power prior to receiving AICH/E-AICH (e.g., report the last transmitted PRACH preamble power). Additionally, the power evaluator 202 can receive a request to identify the UPH or headroom available based upon a reduced measurement period that is less than 100 ms in light of the E-DCH transmission in a CELL_FACH state.

The communications apparatus can further include a packager 204. The packager 204 can include the UPH, identified headroom available, or the transmitted power prior to actual data transmission within scheduling information (SI). Specifically, the information can be included in the SI portion of a header such as, but not limited to, a MAC header. The packager 204 can seamlessly incorporate the UPH information into the SI portion of the MAC header in order to allow a base station, nodeB, and the like to receive such information in a timely manner. In particular, the UPH within the SI portion of the MAC header can be delivered based upon a reduced measurement period that is less than 100 ms.

Moreover, although not shown, it is to be appreciated that communications apparatus 200 can include memory that retains instructions with respect to transmitting a portion of a physical random access channel (PRACH) preamble upon receipt of an acquisition indication channel (AICH), communicating a dedicated physical control channel (DPCCH) for a configurable radio frame, evaluating a transmitted power level for the UE prior to a data transmission associated with E-DCH, incorporating the UPH measurement within a scheduling information (SI) portion of a header, wherein the incorporation is based at least in part upon the evaluated transmitted power level for the E-DCH transmission, and the like.

Furthermore, it is to be appreciated that communications apparatus 200 can include memory that retains instructions with respect to detecting an enhanced dedicated channel (E-DCH) transmission in a CELL_FACH state, utilizing a reduced measurement period to calculate the UPH measurement associated with the E-DCH transmission within CELL_FACH, wherein the reduced measurement period is less than 100 milliseconds, requesting the UPH measurement from the UE based upon the reduced measurement period, evaluating a received portion of scheduling information within a header to identify the requested UPH measurement, and the like. Further, communications apparatus 200 can include a processor that may be utilized in connection with executing instructions (e.g. instructions retained within memory, instructions obtained from a disparate source, . . . ).

Figure 3:
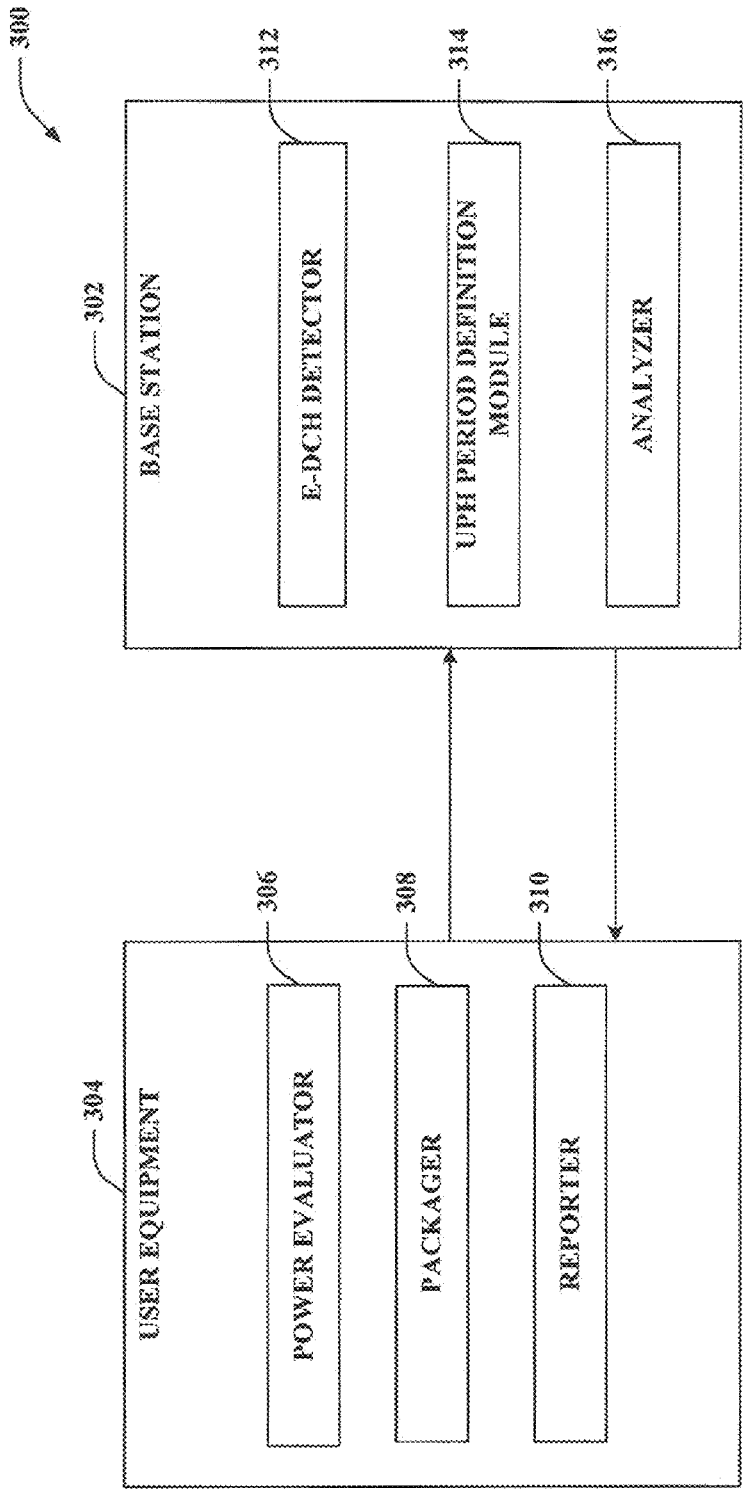
FIG. 3 is an illustration of an example wireless communications system that facilitates reporting uplink power headroom (UPH) measurements at a reduced measurement period during an enhanced dedicated channel (E-DCH) transmission.

Now referring to FIG. 3, illustrated is a wireless communications system 300 that facilitates reporting uplink power headroom (UPH) measurements at a reduced measurement period during an enhanced dedicated channel (E-DCH) transmission. The system 300 includes a base station 302 that communicates with a user equipment (UE) 304 (and/or any number of disparate communication apparatus (not shown)). Base station 302 can transmit information to UE 304 over a forward link channel; further base station 302 can receive information from UE 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the UE 304 as well and vice versa, in one example; the configuration depicted excludes these components for ease of explanation.

UE 304 can include a power evaluator 306. The power evaluator 306 can receive a request based upon a reduced measurement period, wherein the request can initiate an identification of the UPH measurement. The power evaluator 306 can ascertain the UPH measurement upon receipt of AICH/E-AICH and transmission of DPCCH for a configurable number of radio frames. The power evaluator 306 can determine the UPH measurement based upon the transmitted power just prior to data transmission, wherein the data transmission can be an E-DCH transmission in CELL_FACH. It is to be appreciated if no DPCCH preambles were configured when a request for UPH measurement is received, a last transmitted PRACH preamble power prior to receiving AICH/E-AICH can be communicated.

The UE 304 can further include a packager 308 that can incorporate the UPH measurement information into a portion of scheduling information (SI) within a header. In particular, the packager 308 can incorporate the UPH measurement information into the SI portion of a medium access control (MAC) header. The UE 304 can further include a reporter 310 that can communicate or transmit the UPH measurement information within the SI portion of the MAC header to the base station 302. It is to be appreciated that the reporter 310 can communicate such UPH information to the base station 302 based upon a reduced measurement period that is defined as less than 100 ms.

Base station 302 can include an E-DCH detector 312. The can identify an E-DCH transmission in a CELL_FACH state. Based upon identification of an E-DCH transmission, a reduced measurement period can be utilized in order to identify UPH measurements in a more efficient and timely manner. For instance, by requesting the UPH measurement based upon a reduced measurement period for an E-DCH transmission in CELL_FACH, the MAC-e scheduler can schedule the UE 304 in accordance with the reported available headroom.

Additionally, the base station 302 can include a UPH period definition module 314. The UPH period definition module 314 can calculate a reduced measurement period for E-DCH transmissions in CELL_FACH, wherein such reduced measurement period can be calculated to be less than 100 ms. The UPH period definition can request the UPH measurement as frequently as the reduced measurement period is set. For example, if the reduced measurement period is calculated to be 50 ms, then the UPH measurement can be requested every 50 ms during E-DCH transmissions in CELL_FACH state.

Furthermore, the base station 302 can include an analyzer 316. The analyzer 316 can receive the reported header and scheduling information (SI) and identify the UPH measurement incorporated therewith. In other words, the analyzer 316 can evaluate the MAC header and the scheduling information portion in order to utilize the UPH measurement calculated or ascertained. It is to be appreciated that the analyzer 316 can monitor the MAC header in order to identify any suitable information related to the UPH measurement in order to facilitate scheduling the UE 304.

In general, the subject innovation can handle short and burst-like E-DCH transmission in a CELL_FACH state. The E-DCH transmissions in CELL_FACH can be expected to be short (of the order of 100 ms) in duration. For MAC-e scheduling at a NodeB, the UE can report the UPH measurement in the scheduling information (SI). The subject innovation can adapt to the rapid and short duration related to E-DCH transmissions in CELL_FACH states by utilizing a reduced measurement period that is less than 100 ms.

The subject innovation enables the UPH measurement to be communicated to the NodeB prior to when data transmission begins (e.g., when the UE begins E-DCH transmission). After the UE has transmitted the PRACH preamble and has received AICH/E-AICH, the UE can be configured to send DPCCH only for a configurable number of radio frames. The UE can then report the headroom (e.g., UPH) available based on the transmitted power just prior to when the actual data transmission begins. Such reporting of the UPH can be included in the SI portion of the header (e.g., MAC header). It is to be appreciated that if no DPCCH preambles are configured, then the UPH reported can be the last transmitted PRACH preamble power prior to receiving (AICH/E-AICH).

Furthermore, the subject innovation employs a reduced measurement period for the UPH measurement in CELL_FACH state during a E-DCH transmission. In general, the reduced measurement period can be less than 100 ms. For example, the reduced measurement period can be multiples of 10 ms. In another example, the reduced measurement can be 50 ms. It is to be appreciated that the reduced measurement period can be any duration under 100 ms.

It is to be appreciated that if the UE is in CELL_FACH state, the UE can be configured to send DPCCH for a configurable number of radio frames prior to the start of the E-DCH transmissions. The UE in CELL_FACH state reports the headroom available based on the average of the DPCCH power including the period DPCCH is transmitted prior to the start of the E-DCH transmissions. The averaging period for the UE transmission power headroom measurement in CELL_FACH state, after the commencement of the data transmission, is 10 ms. For the first measurement, if less than 20 ms of DPCCH is configured prior to the start of the E-DCH transmissions, the UE in CELL_FACH state reports the headroom available based on the last successfully transmitted PRACH preamble power. In this case, the UPH can be computed from $P_{preamble}$ using the $P_{p-e}$: UPH=$P_{max,tx}$−$P_{preamble}$−$P_{p-e}$, where $P_{max,tx}$ is the UE maximum transmission power, $P_{preamble}$ is the transmitted code power on PRACH preamble, and $P_{p-e}$ is the power offset between the power of the last transmitted preamble and the initial DPCCH transmission power, all in dB.

Moreover, although not shown, it is to be appreciated that base station 302 can include memory that retains instructions with respect transmitting a portion of a physical random access channel (PRACH) preamble upon receipt of an acquisition indication channel (AICH), communicating a dedicated physical control channel (DPCCH) for a configurable radio frame, evaluating a transmitted power level for the UE prior to a data transmission associated with E-DCH, incorporating the UPH measurement within a scheduling information (SI) portion of a header, wherein the incorporation is based at least in part upon the evaluated transmitted power level for the E-DCH transmission, and the like.

Furthermore, it is to be appreciated that base station 302 can include memory that retains instructions with respect to detecting an enhanced dedicated channel (E-DCH) transmission in a CELL_FACH state, utilizing a reduced measurement period to calculate the UPH measurement associated with the E-DCH transmission within CELL_FACH, wherein the reduced measurement period is less than 100 milliseconds, requesting the UPH measurement from the UE based upon the reduced measurement period, evaluating a received portion of scheduling information within a header to identify the requested UPH measurement, and the like. Further, base station 302 can include a processor that may be utilized in connection with executing instructions (e.g., instructions retained within memory, instructions obtained from a disparate source, . . . ).

Figure 4:
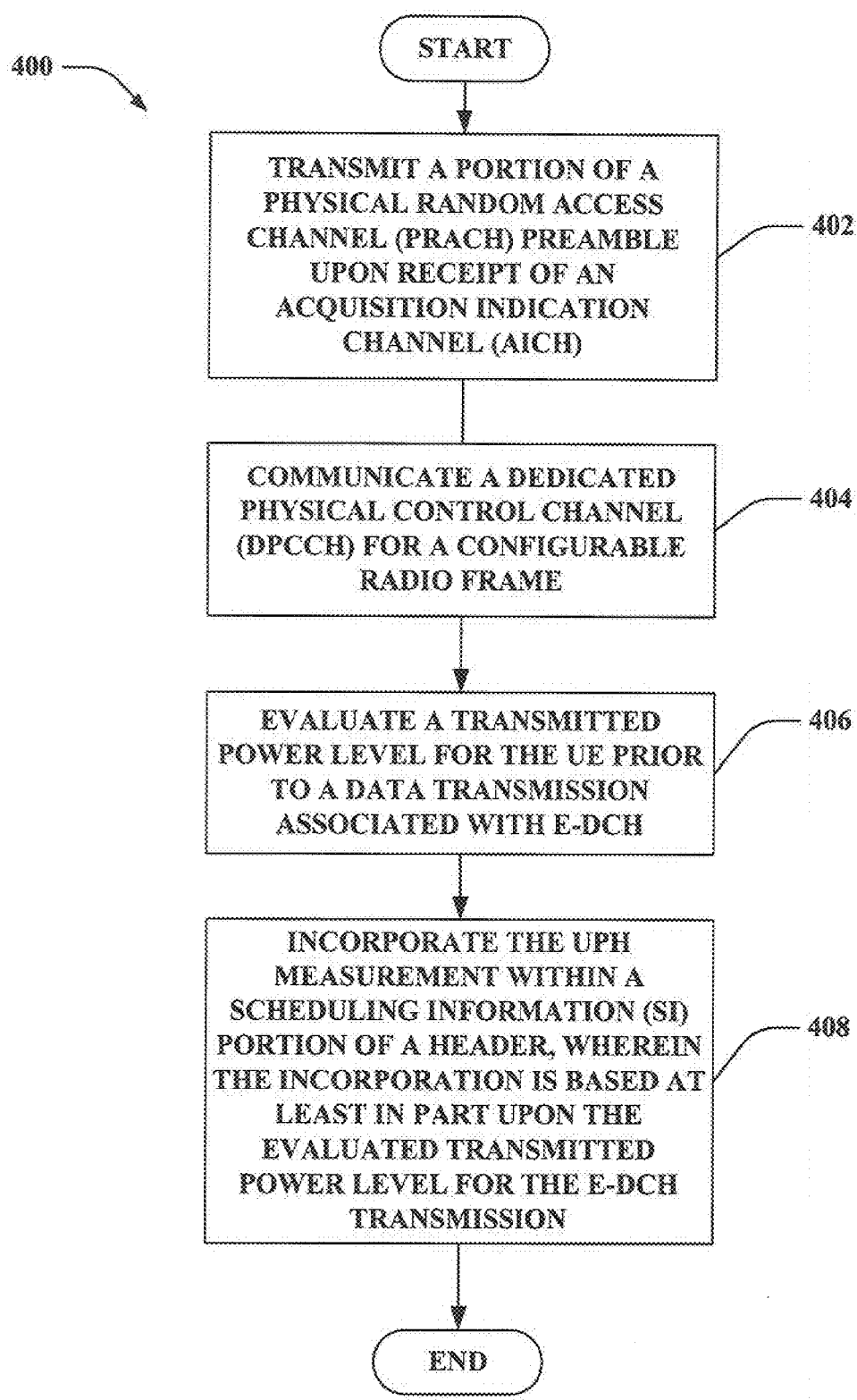
FIG. 4 is an illustration of an example methodology that delivers UPH measurements from a user equipment (UE) during an E-DCH transmission.
Figure 5:
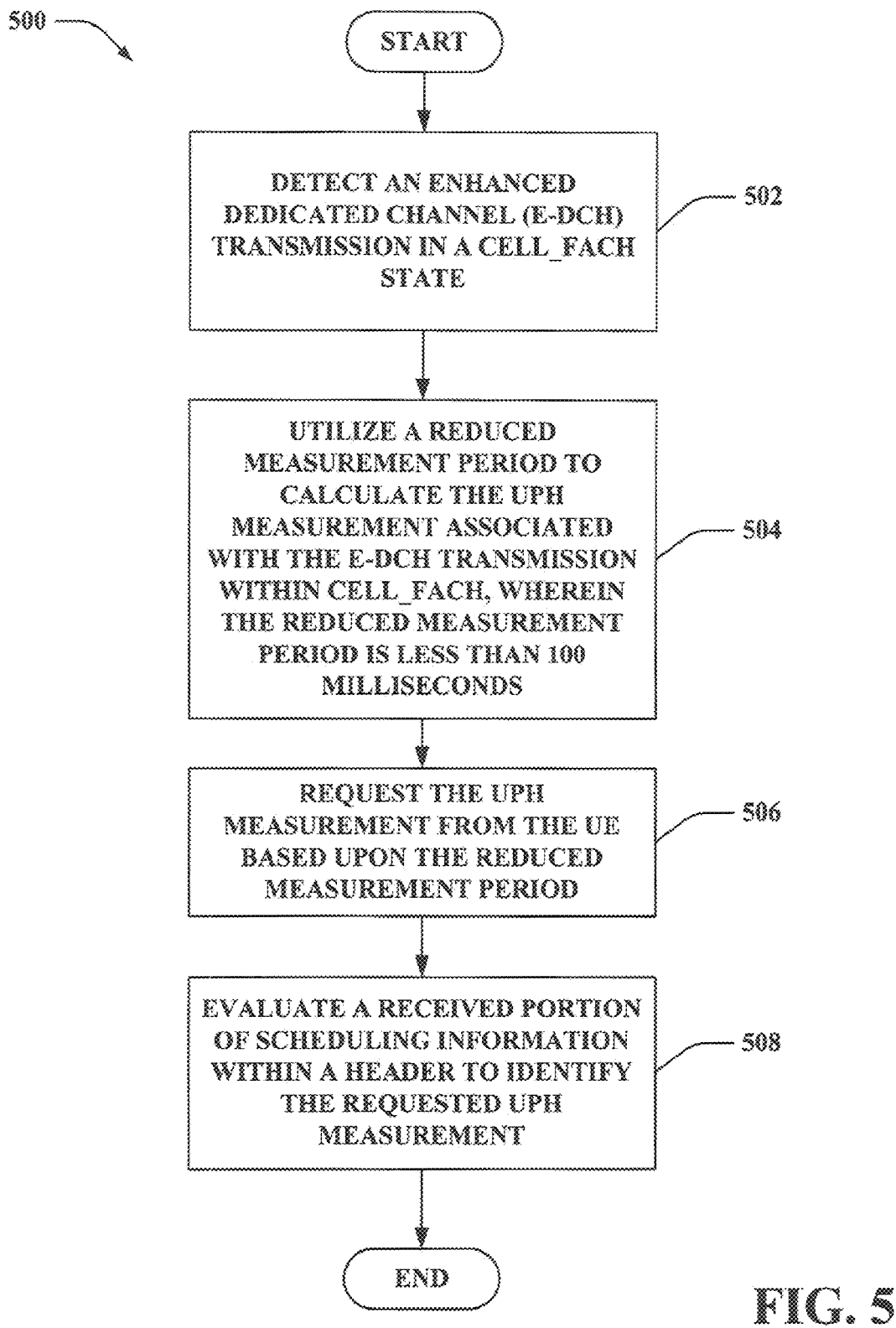
FIG. 5 is an illustration of an example methodology that requests UPH measurements from a UE at a reduced measurement period for an E-DCH transmission.

Referring to FIGS. 4-5, methodologies relating to configuring a flush timer are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, illustrated is a methodology 400 that facilitates delivering UPH measurements from a user equipment (UE) during an E-DCH transmission. At reference numeral 402, a portion of a physical random access channel (PRACH) preamble can be transmitted upon receipt of an acquisition indication channel (AICH). At reference numeral 404, a dedicated physical control channel (DPCCH) for a configurable radio frame can be communicated. At reference numeral 406, a transmitted power level for the UE can be evaluated prior to a data transmission associated with E-DCH. At reference numeral 408, the UPH measurement can be incorporated within a scheduling information (SI) portion of a header, wherein the incorporation is based at least in part upon the evaluated transmitted power level for the E-DCH transmission.

Now referring to FIG. 5, a methodology 500 that facilitates requesting UPH measurements from a UE at a reduced measurement period for an E-DCH transmission. At reference numeral 502, an enhanced dedicated channel (E-DCH) transmission in a CELL_FACH state can be detected. At reference numeral 504, a reduced measurement period can be utilized to calculate the UPH measurement associated with the E-DCH transmission within CELL_FACH, wherein the reduced measurement period is less than 100 milliseconds. At reference numeral 506, the UPH measurement can be requested from the UE based upon the reduced measurement period. At reference numeral 508, a received portion of scheduling information within a header can be evaluated to identify the requested UPH measurement.

Figure 6:
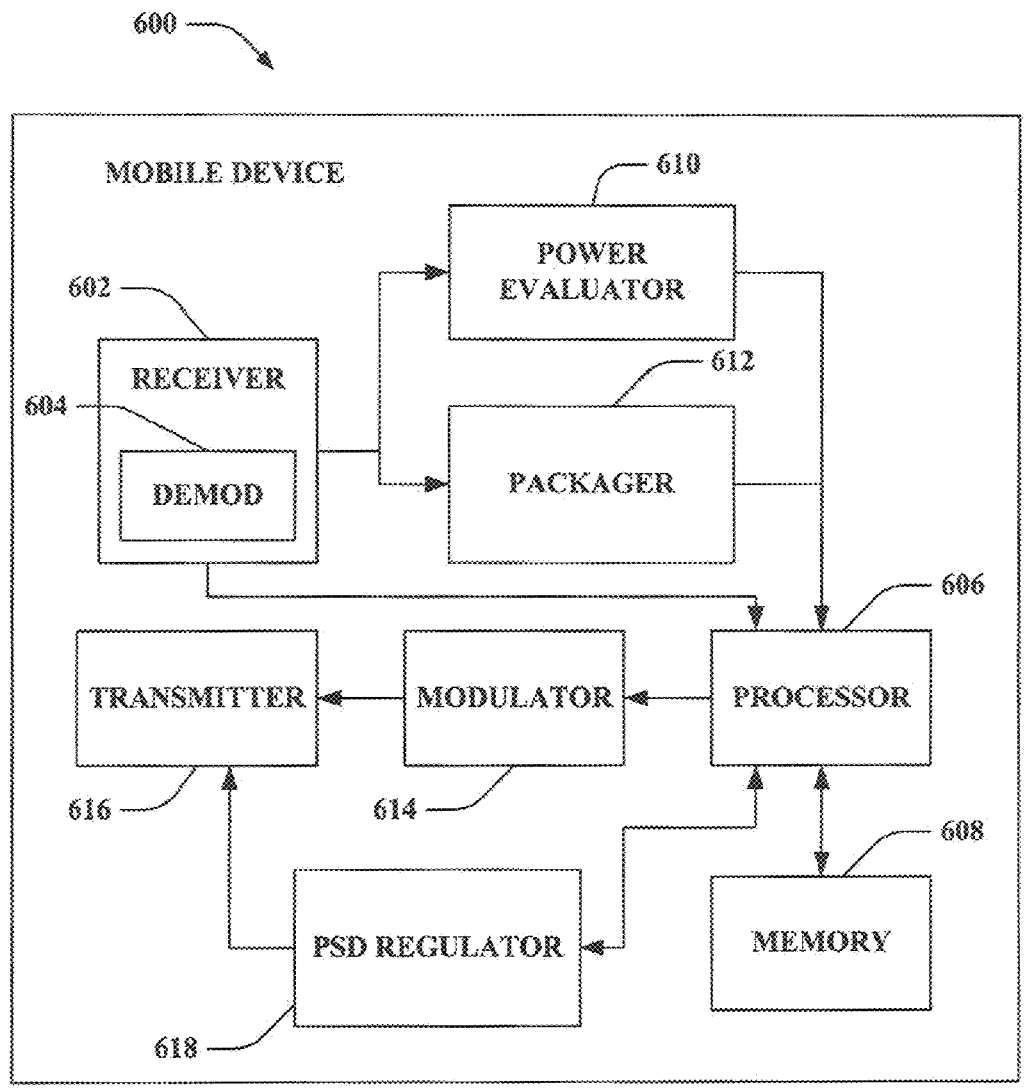
FIG. 6 is an illustration of an example mobile device that facilitates packaging UPH measurements in scheduling information (SI) within a header in a wireless communication system.

FIG. 6 is an illustration of a mobile device 600 that facilitates packaging UPH measurements in scheduling information (SI) within a header in a wireless communication system. Mobile device 600 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of mobile device 600, and/or a processor that both analyzes information received by receiver 602, generates information for transmission by transmitter 616, and controls one or more components of mobile device 600.

Mobile device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 606 can further be operatively coupled to at least one of a power evaluator 610 or a packager 612. The power evaluator 610 can ascertain the available headroom (e.g. UPH) based on a transmitted power level prior to when an E-DCH data transmission begins. In particular, the power evaluator 202 can configure the communication apparatus 200 to send DPCCH for a configurable number of radio frames and then report the headroom available prior to actual data transmission. It is to be appreciated that if no DPCCH preambles are configured, the power evaluator 202 can report a most recent transmitted PRACH preamble power prior to receiving AICH/E-AICH (e.g. report the last transmitted PRACH preamble power). The packager 204 can include the UPH measurement within a scheduling information (SI) portion of a MAC header. In particular, the UPH within the SI portion of the MAC header can be delivered based upon a reduced measurement period that is less than 100 ms.

Mobile device 600 still further comprises a modulator 614 and transmitter 616 that respectively modulate and transmit signals to, for instance, a base station, another mobile device, etc. Although depicted as being separate from the processor 606, it is to be appreciated that the power evaluator 610, packager 612, demodulator 604, and/or modulator 614 can be part of the processor 606 or multiple processors (not shown).

Figure 7:
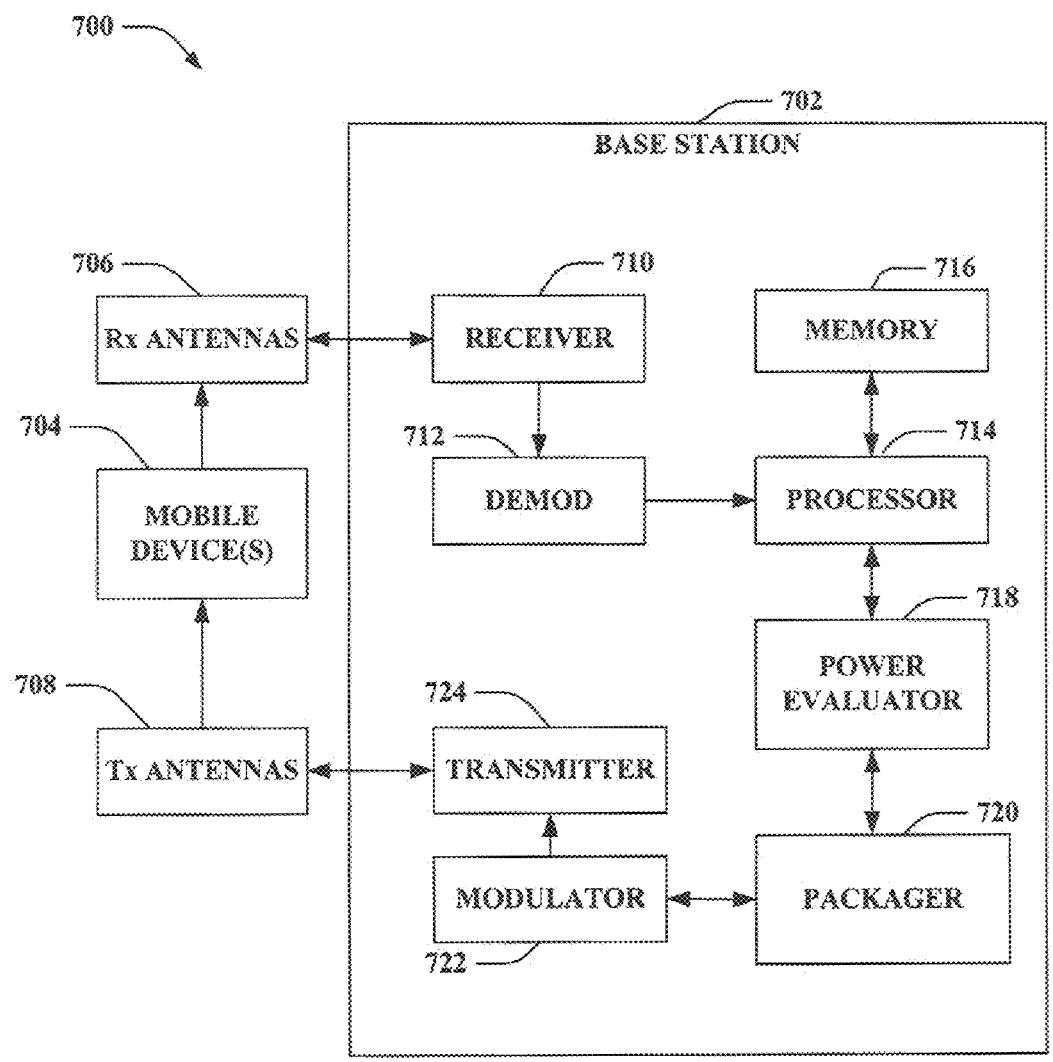
FIG. 7 is an illustration of an example system that facilitates enabling a UE to communicate UPH measurements more frequently during E-DCH transmissions in a wireless communication environment.

FIG. 7 is an illustration of a system 700 that facilitates enabling a UE to communicate UPH measurements more frequently during E-DCH transmissions in a wireless communication environment as described supra. The system 700 comprises a base station 702 (e.g., access point, . . . ) with a receiver 710 that receives signal(s) from one or more mobile devices 704 through a plurality of receive antennas 706, and a transmitter 724 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein.

Moreover, the processor 714 can be coupled to at least one of a power evaluator 718 or a packager 720. The power evaluator 610 can ascertain the available headroom (e.g., UPH) based on a transmitted power level prior to when an E-DCH data transmission begins. In particular, the power evaluator 202 can configure the communication apparatus 200 to send DPCCH for a configurable number of radio frames and then report the headroom available prior to actual data transmission. It is to be appreciated that if no DPCCH preambles are configured, the power evaluator 202 can report a most recent transmitted PRACH preamble power prior to receiving AICH/E-AICH (e.g. report the last transmitted PRACH preamble power). The packager 204 can include the UPH measurement within a scheduling information (SI) portion of a MAC header. In particular, the UPH within the SI portion of the MAC header can be delivered based upon a reduced measurement period that is less than 100 ms.

Furthermore, although depicted as being separate from the processor 714, it is to be appreciated that the power evaluator 718, packager 720, demodulator 712, and/or modulator 722 can be part of the processor 714 or multiple processors (not shown).

Figure 8:
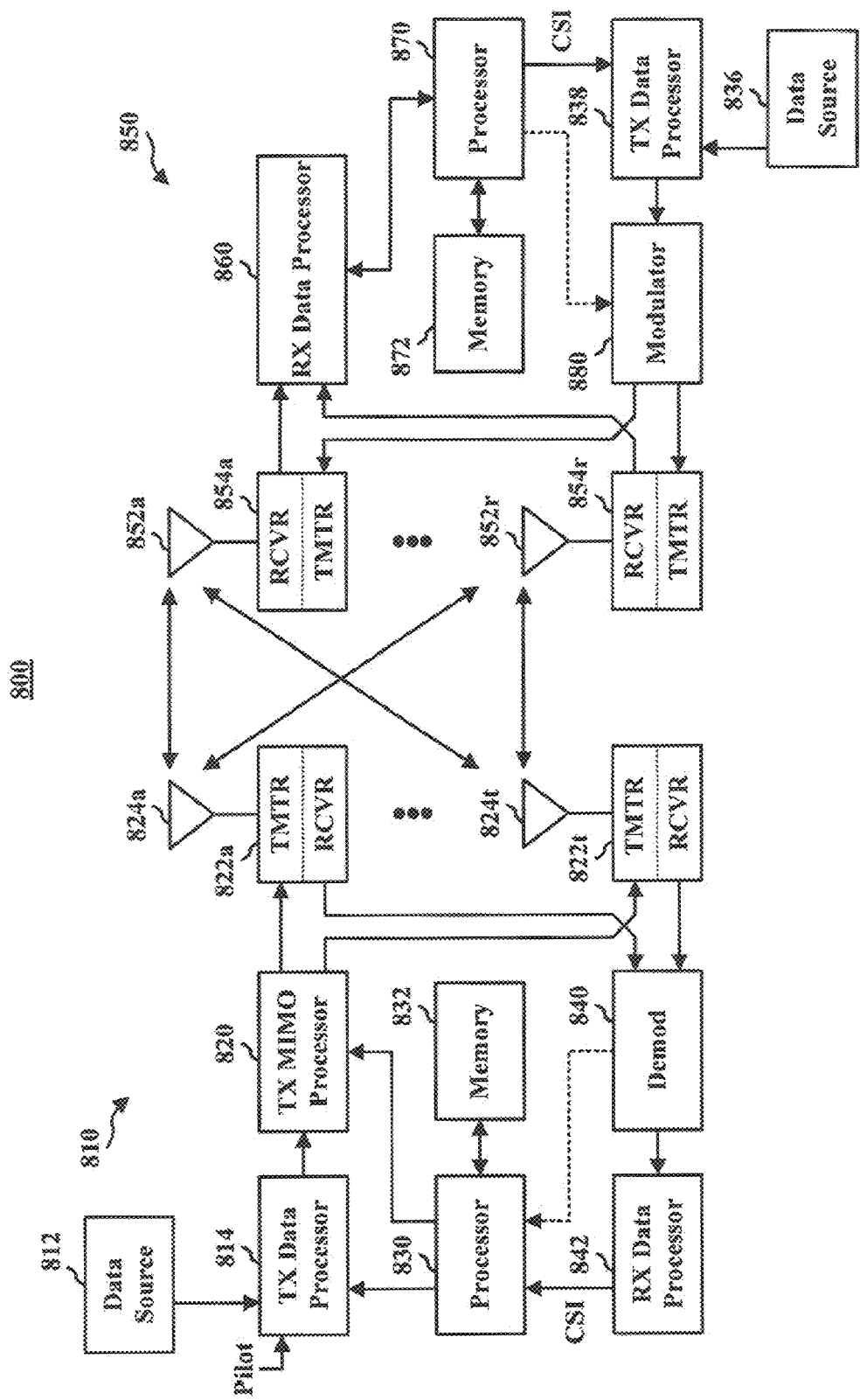
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-3 and 6-7) and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g. control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
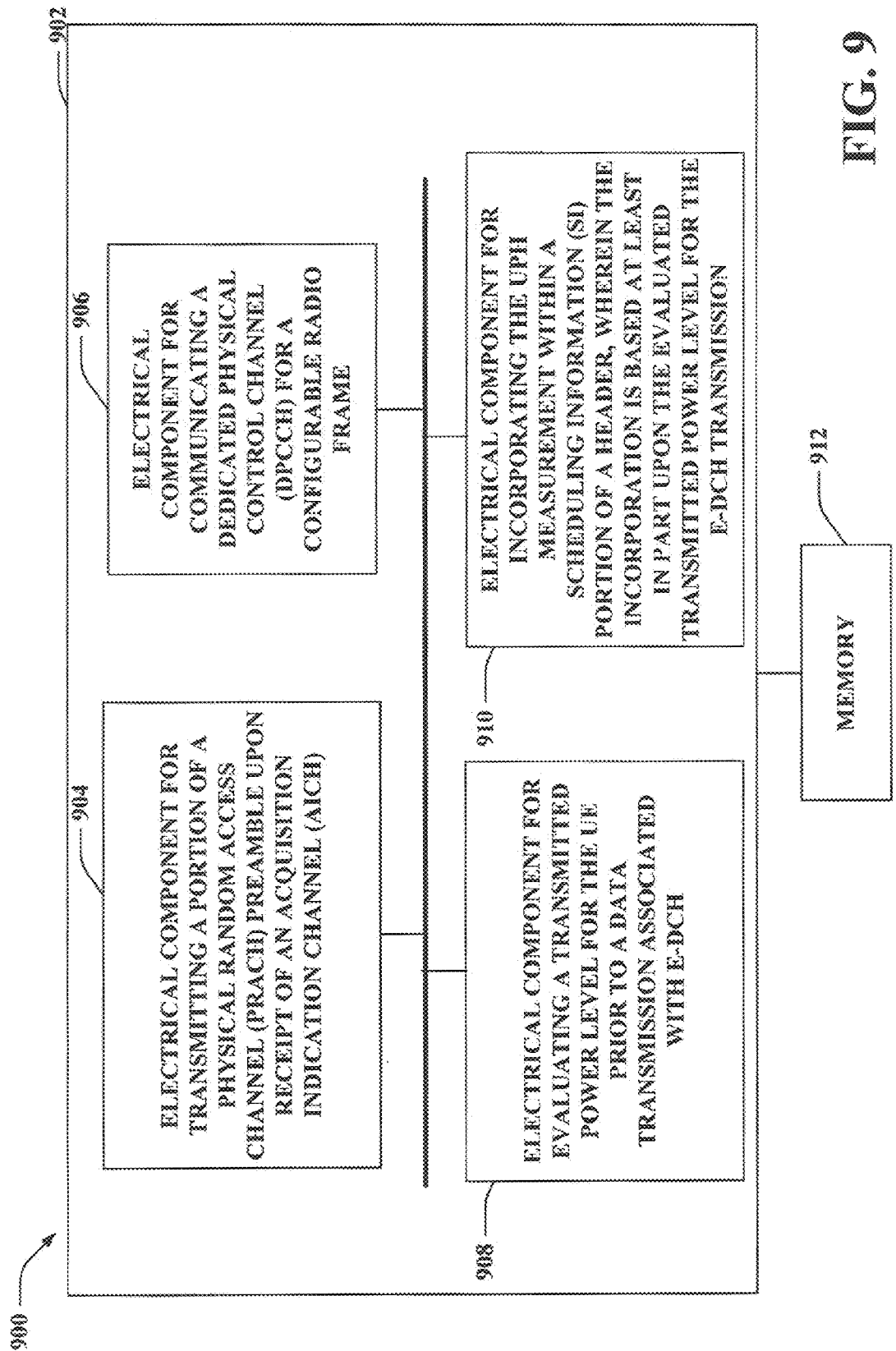
FIG. 9 is an illustration of an example system that facilitates reporting uplink power headroom (UPH) measurements at a reduced measurement period during an enhanced dedicated channel (E-DCH) transmission.

With reference to FIG. 9, illustrated is a system 900 that facilitates reporting uplink power headroom (UPH) measurements at a reduced measurement period during an enhanced dedicated channel (E-DCH) transmission. For example, system 900 can reside at least partially within a base station, a radio network controller (RNC), mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. The logical grouping 902 can include an electrical component for transmitting a portion of a physical random access channel (PRACH) preamble upon receipt of an acquisition indication channel (AICH) 904. In addition, the logical grouping 902 can comprise an electrical component for communicating a dedicated physical control channel (DPCCH) for a configurable radio frame 906. Moreover, the logical grouping 902 can include an electrical component for evaluating a transmitted power level for the UE prior to a data transmission associated with E-DCH 908. The logical grouping 902 can include an electrical component for incorporating the UPH measurement within a scheduling information (SI) portion of a header, wherein the incorporation is based at least in part upon the evaluated transmitted power level for the E-DCH transmission 910. Additionally, system 900 can include a memory 912 that retains instructions for executing functions associated with electrical components 904, 906, 908, and 910. While shown as being external to memory 912, it is to be understood that one or more of electrical components 904, 906, 908, and 910 can exist within memory 912.

Figure 10:
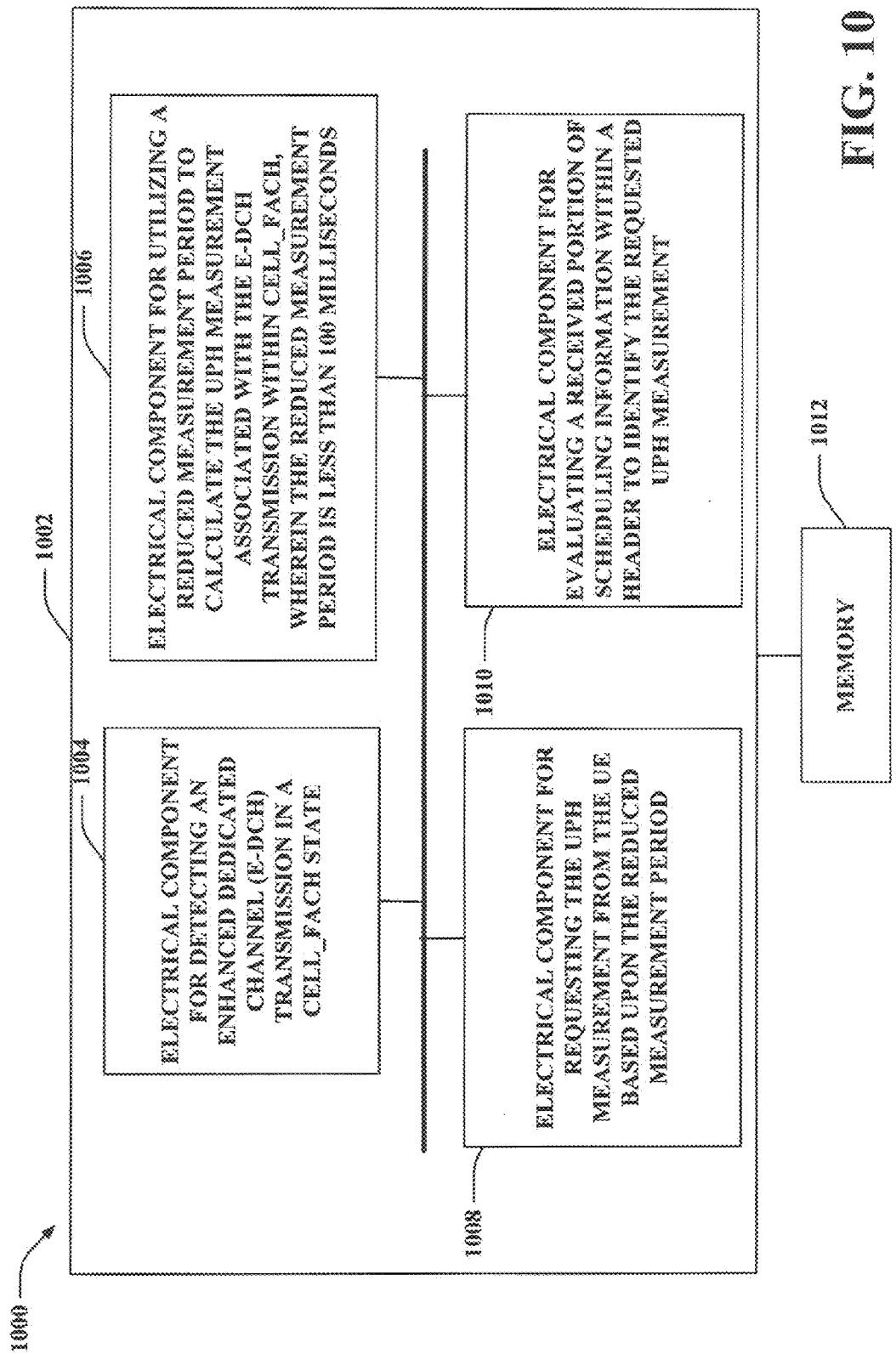
FIG. 10 is an illustration of an example system that can request UPH measurements from a UE at a reduced measurement period for an E-DCH transmission.

Turning to FIG. 10, illustrated is a system 1000 that can request UPH measurements from a UE at a reduced measurement period for an E-DCH transmission. System 1000 can reside within a base station, a radio network controller (RNC), mobile device, etc., for instance. As depicted, system 1000 includes functional blocks that can represent functions implemented by a processor, software, or combination thereof (e.g., firmware). System 1000 includes a logical grouping 1002 of electrical components that facilitate defining a reduced measurement period related to UPH measurements during a E-DCH transmission. The logical grouping 1002 can include an electrical component for detecting an enhanced dedicated channel (E-DCH) transmission in a CELL_FACH state 1004. In addition, the logical grouping 1002 can comprise an electrical component for utilizing a reduced measurement period to calculate the UPH measurement associated with the E-DCH transmission within CELL_FACH, wherein the reduced measurement period is less than 100 milliseconds 1006. Furthermore, the logical grouping 1002 can include an electrical component for requesting the UPH measurement from the UE based upon the reduced measurement period 1008. The logical grouping 1002 can include an electrical component for evaluating a received portion of scheduling information within a header to identify the requested UPH measurement 1010. Additionally, system 1000 can include a memory 1012 that retains instructions for executing functions associated with electrical components 1004, 1006, 1008, and 1010. While shown as being external to memory 1012, it is to be understood that electrical components 1004, 1006, 1008, 1010 can exist within memory 1012.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates delivering an Uplink Power Headroom (UPH) measurement associated with an enhanced dedicated channel (E-DCH) transmission in a CELL_FACH state, comprising:
   transmitting a portion of a physical random access channel (PRACH) preamble upon receipt of an acquisition indication channel (AICH);
   communicating a dedicated physical control channel (DPCCH) for a configurable radio frame;
   evaluating a transmitted power level for a user equipment (UE) prior to a data transmission associated with E-DCH; and
   incorporating the UPH measurement within a scheduling information (SI) portion of a header, wherein the incorporation is based at least in part upon the evaluated transmitted power level for the E-DCH transmission.

2. The method of claim 1, further comprising reporting the SI portion of the header to at least one of a base station, a serving base station, a target base station, a network, a server, or an eNode B.

3. The method of claim 1, wherein the header is a medium access control (MAC) header.

4. The method of claim 1, further comprising utilizing the SI portion of the header to identify a UPH measurement for a user equipment.

5. The method of claim 1, further comprising receiving a request to report the UPH measurement based upon a reduced measurement period, wherein the reduced measurement period is less than 100 milliseconds.

6. The method of claim 1, further comprising ascertaining whether a DPCCH preamble is configured.

7. The method of claim 6, further comprising reporting a previous transmitted preamble power prior to receiving the AICH if no DPCCH preamble is configured.

8. The method of claim 7, further comprising utilizing the previous transmitted preamble power is the transmitted power for a previous data transmission, wherein the previous transmitted power is a last transmitted PRACH preamble power.

9. The system of claim 1, further comprising utilizing the UPH measurement with a MAC-e scheduler to schedule the UE.

10. The system of claim 1, further comprising utilizing the UPH measurement with a MAC-e scheduler to employ at least one of the following:
a reduction in time for the E-DCH transmission;
a decrease of a collision probability of an E-DCH resource; or
a decrease of a blocking probability of an E-DCH resource.

11. A wireless communications apparatus, comprising:
at least one processor configured to:
transmit a portion of a physical random access channel (PRACH) preamble upon receipt of an acquisition indication channel (AICH);
communicate a dedicated physical control channel (DPCCH) for a configurable radio frame;
evaluate a transmitted power level for a user equipment (UE) prior to a data transmission;
incorporate the UPH measurement within a scheduling information (SI) portion of a header, wherein the incorporation is based at least in part upon the evaluated transmitted power level for the E-DCH transmission; and
a memory coupled to the at least one processor.

12. The wireless communications apparatus of claim 11, further comprising at least one processor configured to report the SI portion of the header to at least one of a base station, a serving base station, a target base station, a network, a server, or an eNode B.

13. The wireless communications apparatus of claim 11, further comprising at least one processor configured to utilize the SI portion of the header to identify a UPH measurement for a user equipment.

14. A wireless communications apparatus that enables delivering an Uplink Power Headroom (UPH) measurement associated with an enhanced dedicated channel (E-DCH) transmission in a CELL_FACH state, comprising:
means for transmitting a portion of a physical random access channel (PRACH) preamble upon receipt of an acquisition indication channel (AICH);
means for communicating a dedicated physical control channel (DPCCH) for a configurable radio frame;
means for evaluating a transmitted power level for a user equipment (UE) prior to a data transmission; and
means for incorporating the UPH measurement within a scheduling information (SI) portion of a header, wherein the incorporation is based at least in part upon the evaluated transmitted power level for the E-DCH transmission.

15. The wireless communications apparatus of claim 14, further comprising means for reporting the SI portion of the header to at least one of a base station, a serving base station, a target base station, a network, a server, or an eNode B.

16. The wireless communications apparatus of claim 14, further comprising means for utilizing the SI portion of the header to identify a UPH measurement for a user equipment.

17. The wireless communications apparatus of claim 14, further comprising means for receiving a request to report the UPH measurement based upon a reduced measurement period, wherein the reduced measurement period is less than 100 milliseconds.

18. A non-transitory computer-readable medium encoded with computer executable instructions comprising: code for causing at least one computer to transmit a portion of a physical random access channel (PRACH) preamble upon receipt of an acquisition indication channel (AICH); code for causing at least one computer to communicate a dedicated physical control channel (DPCCH) for a configurable radio frame; code for causing at least one computer to evaluate a transmitted power level for a user equipment (UE) prior to a data transmission; and code for causing at least one computer to incorporate the UPH measurement within a scheduling information (SI) portion of a header, wherein the incorporation is based at least in part upon the evaluated transmitted power level for the E-DCH transmission.

19. A method that facilitates receiving an Uplink Power Headroom (UPH) measurement for a user equipment (UE) in CELL_FACH, comprising:
detecting an enhanced dedicated channel (E-DCH) transmission in a CELL_FACH state;
utilizing a reduced measurement period to calculate the UPH measurement associated with the E-DCH transmission within CELL_FACH, wherein the reduced measurement period is less than 100 milliseconds;
requesting the UPH measurement from the UE based upon the reduced measurement period; and
evaluating a received portion of scheduling information (SI) within a header to identify the requested UPH measurement.

20. The method of claim 19, further comprising defining the UPH measurement as an average value of the UE transmission power headroom over the reduced measurement period.

21. The method of claim 19, further comprising utilizing a measurement period of 100 milliseconds to calculate the UPH measurement for a non-CELL_FACH state transmission.

22. The method of claim 19, further comprising utilizing a measurement period of 100 milliseconds to calculate the UPH measurement for a non-E-DCH transmission.

23. The method of claim 19, further comprising receiving a PRACH preamble from the UE.

24. The method of claim 23, further comprising transmitting an AICH to the UE.

25. The method of claim 24, further comprising receiving a DPCCH for a configurable radio frame.

26. The method of claim 25, further comprising utilizing a headroom available based on a transmitted power prior to data transmission as the UPH measurement.

27. The method of claim 19, further comprising utilizing the UPH measurement with a MAC-e scheduler to schedule the UE.

28. The method of claim 19, further comprising utilizing the UPH measurement with a MAC-e scheduler to employ at least one of the following: a reduction in time for the E-DCH transmission; a decrease of a collision probability of an E-DCH resource; or a decrease of a blocking probability of an E-DCH resource.

29. A wireless communications apparatus, comprising:
at least one processor configured to:
 detect an enhanced dedicated channel (E-DCH) transmission in a CELL_FACH state;
 utilize a reduced measurement period to calculate the UPH measurement associated with the E-DCH transmission within CELL_FACH, wherein the reduced measurement period is less than 100 milliseconds;
 request the UPH measurement from the UE based upon the reduced measurement period;
 evaluate a received portion of scheduling information (SI) within a header to identify the requested UPH measurement; and
a memory coupled to the at least one processor.

30. The wireless communications apparatus of claim 29, further comprising at least one processor configured to define the UPH measurement as an average value of the UE transmission power headroom over the reduced measurement period.

31. The wireless communications apparatus of claim 29, further comprising at least one processor configured to utilize a measurement period of 100 milliseconds to calculate the UPH measurement for a non-CELL_FACH state transmission.

32. The wireless communications apparatus of claim 29, further comprising at least one processor configured to utilize a measurement period of 100 milliseconds to calculate the UPH measurement for a non-E-DCH transmission.

33. The wireless communications apparatus of claim 29, further comprising at least one processor configured to receive a PRACH preamble from the UE.

34. The wireless communications apparatus of claim 33, further comprising at least one processor configured to transmit an AICH to the UE.

35. A wireless communications apparatus that enables receiving an Uplink Power Headroom (UPH) measurement for a user equipment (UE) in CELL_FACH, comprising:
 means for detecting an enhanced dedicated channel (E-DCH) transmission in a CELL_FACH state;
 means for utilizing a reduced measurement period to calculate the UPH measurement associated with the E-DCH transmission within CELL_FACH, wherein the reduced measurement period is less than 100 milliseconds;
 means for requesting the UPH measurement from the UE based upon the reduced measurement period; and
 means for evaluating a received portion of scheduling information (SI) within a header to identify the requested UPH measurement.

36. The wireless communications apparatus of claim 35, further comprising means for defining the UPH measurement as an average value of the UE transmission power headroom over the reduced measurement period.

37. The wireless communications apparatus of claim 35, further comprising means for utilizing a measurement period of 100 milliseconds to calculate the UPH measurement for a non-CELL_FACH state transmission.

38. A non-transitory computer-readable medium encoded with computer executable instructions comprising: code for causing at least one computer to detect an enhanced dedicated channel (E-DCH) transmission in a CELL_FACH state; code for causing at least one computer to utilize a reduced measurement period to calculate the UPH measurement associated with the E-DCH transmission within CELL_FACH, wherein the reduced measurement period is less than 100 milliseconds; code for causing at least one computer to request the UPH measurement from the UE based upon the reduced measurement period; and code for causing at least one computer to evaluate a received portion of scheduling information (SI) within a header to identify the requested UPH measurement.

39. The non-transitory computer-readable medium encoded with computer executable instructions of claim 38, wherein the computer readable medium further comprising code for causing the at least one computer to utilize a measurement period of 100 milliseconds to calculate the UPH measurement for a non-CELL_FACH state transmission.

40. The non-transitory computer-readable medium encoded with computer executable instructions of claim 38, wherein the computer readable medium further comprising code for causing the at least one computer to utilize a measurement period of 100 milliseconds to calculate the UPH measurement for a non-E-DCH transmission.

* * * * *